US011126372B2

(12) United States Patent
Herrell et al.

(10) Patent No.: US 11,126,372 B2
(45) Date of Patent: *Sep. 21, 2021

(54) EXTERNAL MEMORY CONTROLLER

(71) Applicant: Hewlett Packard Enterprise Development LP, Houston, TX (US)

(72) Inventors: Russ W. Herrell, Fort Collins, CO (US); Gary Gostin, Plano, TX (US); Gregg B Lesartre, Fort Collins, CO (US); Dale C. Morris, Steamboat Springs, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/680,254

(22) Filed: Nov. 11, 2019

(65) Prior Publication Data

US 2020/0081650 A1 Mar. 12, 2020

Related U.S. Application Data

(63) Continuation-in-part of application No. 14/780,389, filed as application No. PCT/US2013/034796 on Apr. 1, 2013, now Pat. No. 10,474,380.

(51) Int. Cl.
*G06F 3/06* (2006.01)

(52) U.S. Cl.
CPC .......... *G06F 3/0658* (2013.01); *G06F 3/0604* (2013.01); *G06F 3/0683* (2013.01)

(58) Field of Classification Search
CPC .... G06F 3/0658; G06F 3/0604; G06F 3/0683; G06F 13/00; G06F 12/00

USPC .......................................... 711/100, 154, 200
See application file for complete search history.

(56) References Cited

U.S. PATENT DOCUMENTS

| 5,687,393 A | 11/1997 | Brown et al. |
| 6,185,620 B1 | 2/2001 | Weber et al. |
| 6,493,343 B1 * | 12/2002 | Garcia ................ G06F 12/0292 370/394 |
| 6,944,719 B2 | 9/2005 | Rowlands et al. |

(Continued)

FOREIGN PATENT DOCUMENTS

| CN | 1256458 A | 6/2000 |
| CN | 101356515 A | 1/2009 |

(Continued)

OTHER PUBLICATIONS

Extended European Search Report received for EP Patent Application No. 13881361.3, dated Nov. 7, 2016, 7 pages.

(Continued)

*Primary Examiner* — Tuan V Thai
(74) *Attorney, Agent, or Firm* — Park, Vaughan, Fleming & Dowler LLP

(57) ABSTRACT

A computing system is disclosed herein. The computing system includes a computing node and a remote memory node coupled to the computing node via a system fabric. The computing node includes a plurality of processors and a master memory controller. The master memory controller is external to the plurality of processors. The master memory controller routes requests corresponding to requests from the plurality of processors across the system fabric to the remote memory node and returns a response.

15 Claims, 4 Drawing Sheets

(56) References Cited

U.S. PATENT DOCUMENTS

| | | |
|---|---|---|
| 7,353,345 B1 | 4/2008 | Onufryk et al. |
| 7,802,023 B2 | 9/2010 | Yamazaki et al. |
| 7,882,327 B2 | 2/2011 | Kalyanasundharam et al. |
| 9,201,602 B2 | 12/2015 | Hashimoto |
| 2001/0027512 A1 | 10/2001 | Hagersten |
| 2003/0023666 A1 | 1/2003 | Conway et al. |
| 2004/0117562 A1 | 6/2004 | Wu et al. |
| 2007/0101158 A1 | 5/2007 | Elliott |
| 2007/0226424 A1* | 9/2007 | Clark ................. G06F 12/0817 711/141 |
| 2008/0082622 A1* | 4/2008 | Pong ....................... G06F 15/16 709/212 |
| 2009/0210616 A1 | 8/2009 | Karamcheti et al. |
| 2009/0210636 A1 | 8/2009 | Karamcheti et al. |
| 2009/0240896 A1 | 9/2009 | Kang |
| 2010/0005317 A1 | 1/2010 | Pribadi et al. |
| 2011/0131373 A1* | 6/2011 | Kumar ................ G06F 11/2089 711/113 |
| 2011/0252168 A1 | 10/2011 | Saripalli |
| 2011/0320668 A1 | 12/2011 | Liu |
| 2013/0132505 A1 | 5/2013 | Morris |
| 2013/0132587 A1 | 5/2013 | Morris |
| 2016/0041772 A1 | 2/2016 | Dahlen et al. |

FOREIGN PATENT DOCUMENTS

| | | |
|---|---|---|
| CN | 101883446 A | 11/2010 |
| TW | 201205301 A | 2/2012 |
| TW | 201214142 A | 4/2012 |
| TW | 201237624 A | 9/2012 |
| TW | 201239622 A | 10/2012 |

OTHER PUBLICATIONS

Search Report and Written Opinion received for PCT Application No. PCT/US2013/034796, dated Jan. 10, 2014, 11 pages.

Zhang, L., "ISIM: The Simulator for the Impulse Adaptable Memory System," (Research Paper), Sep. 18, 1998, 47 pages.

* cited by examiner

200

300

400

EXTERNAL MEMORY CONTROLLER

CROSS-REFERENCE TO RELATED APPLICATION

This application is a United States National Stage Application of International Patent Application No. PCT/US2013/034796, filed on Apr. 1, 2013, the contents of which are incorporated by reference as if set forth in their entirety herein.

BACKGROUND

A CPU, or microprocessor chip, is an integrated circuit which includes a processor, or a plurality of processors, on a single substrate. The substrate is a semiconductor material, such as silicon. Current trends have resulted in more of the system functions of a computing device, such as memory controllers, being included on the CPU substrate or within the CPU package with the processor(s).

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
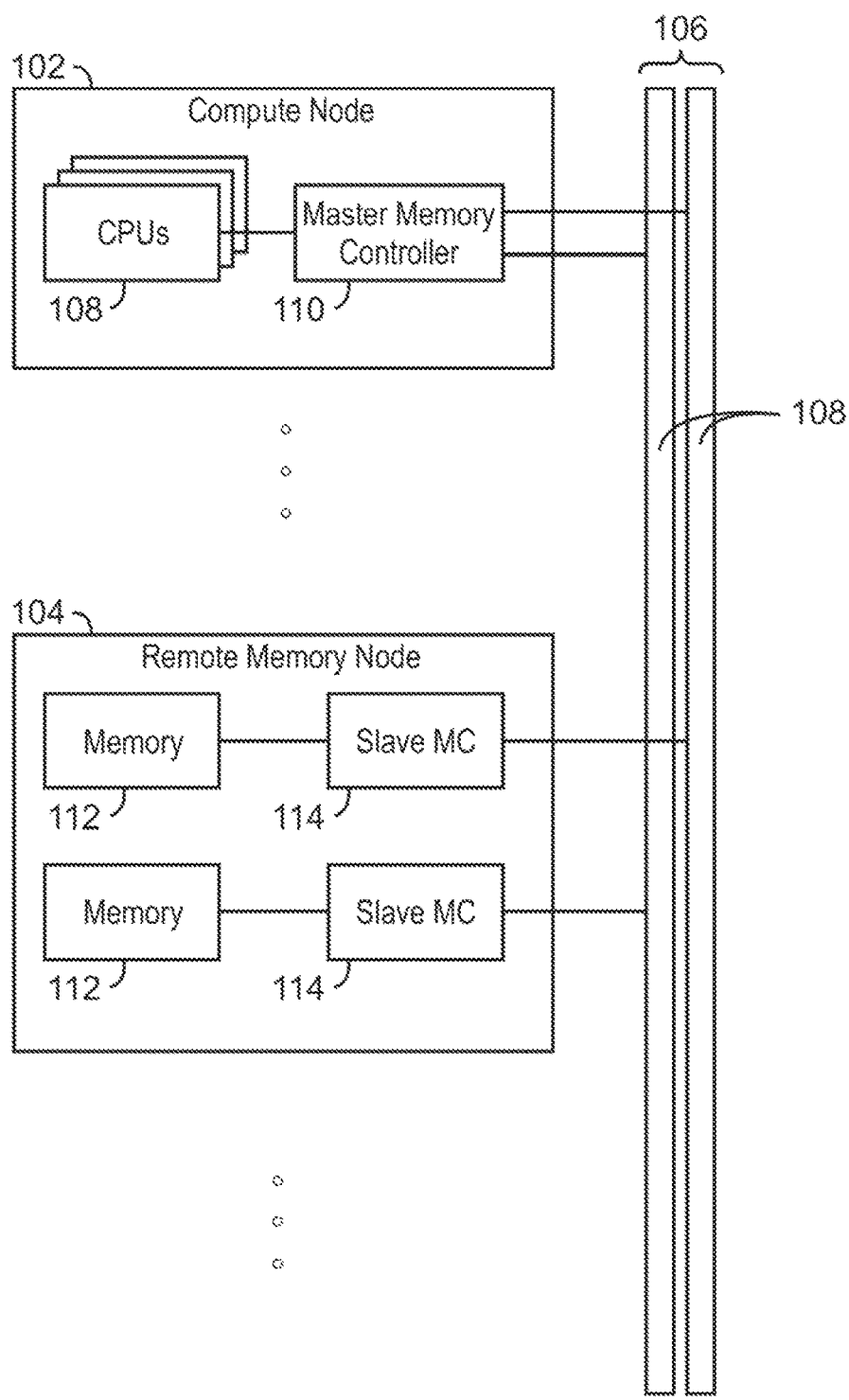
FIG. 1 is a block diagram of an example of a computing system.

Techniques described herein relate generally to memory controllers. More specifically, techniques described herein relate to an external memory controller. "External" refers to a memory controller that is separated, such as physically or as a unique functional block, from associated processors, but communicably coupled to the processors. The external memory controller can be physically separate from the processors, or the external memory controller can be a unique functional block. For example, the external memory controller can be included on a processor die, such as in a system on a chip (SOC) design. In the example, the external memory controller is a unique functional block, which may share the silicon die with the processor(s). As CPU vendors put more system functions into the CPU packages, they create limitations regarding the CPU packages. In particular, when memory controllers were added to CPU packages, limits were set on the ratio of memory capacity to cores. When I/O bridges were added to the CPU packages, limits were set on the amount of I/O per core. Many applications will not perform optimally with ratios of core, memory and I/O supported directly by a CPU package. Further, the optimal ratio may change over time as the workload executed on the CPU package changes.

At the same time that these limitations were imposed by the inclusion of memory controllers and I/O bridges, applications expanded address space, memory, and I/O requirements. In response to these expanded requirements, large physical address ranges are implemented in cores and interconnect fabrics to ease programmers' burdens and enable applications with expanded requirements to scale to large throughputs and to handle large data sets.

Modern solutions to large scale data problems often use more memory, more storage, and possibly more total throughput than can be supported by a single, highly integrate CPU package. For example, while a single package with fifteen to twenty cores might currently be used to address petabytes of storage or memory, the CPU package itself cannot accommodate such a capacity. Applications which perform best with larger amounts of memory or I/O per core are faced with non-optimal configurations from which to choose, and are often scaled to multiple packages in order to have enough memory and/or I/O to operate optimally, leaving the additional cores underutilized. Unfortunately, as the package count grows, the mismatch between cores, memory, and I/O ratios also grows. The package count in a computing device will be set to a number that satisfies the largest request for one of the three resources, memory, storage, or cores, and the excess capacities of the remaining two resources represent waste and inefficiency. Thus, large scale resources also have potentially large amounts of wasted resources.

Modern, large scale processing problems are solved by either using a very large shared memory processing (SMP) system, or by using a large cluster of small processing systems. SMP systems have large logical processor counts, for example, up to hundreds of cores or execution threads, which can share a correspondingly large address space and common memory map. SMP systems are implemented by tying multiple CPU packages, such as 16, 32, or 64, together on a common, memory-coherent connection fabric. As used herein, a fabric is an interconnected communication system that can include computer busses, links, switches, and the like. Additionally, managing large coherency and error domains encompassing all packages sharing resources creates further limitations.

A large cluster of small processing systems have compute nodes that host a few to, in some cases, nearly one hundred cores or execution threads. The compute nodes are tied together with some form of I/O fabric network. The clusters of processing systems may have large file systems and pass messages and data as files. However, a lack of independent scaling of local memory and storage capacities, as well as limited bandwidth of node-to-node connections, can limit the use of clusters of processing systems.

FIG. 1 is a block diagram of an example of a computing system, such as a server cluster. The computing system 100 includes a number of nodes, such as a computing node 102 and a remote memory node 104. Remote memory node 104 can be accessed via cache line access. The computing system 100 can include several compute nodes, such as several tens or even thousands of compute nodes.

The nodes 102 and 104 are communicably coupled to each other through a bus 106, such as through a system fabric. The system fabric can be any type of communication fabric, such as a cluster fabric, PCIe, InfiniBand, or a custom fabric. The system fabric can be a low latency, high bandwidth, highly reliable fabric. In an example, the system fabric can be a cluster fabric, such as an industry standard fabric or a propriety fabric. For example, the system fabric can be an Ethernet fabric, an Infiniband fabric, a PCIexpress fabric, or any other suitable fabric. The system fabric can include multiple switches 108, which act as redundancy to each other.

The compute nodes 102 include central processing units (CPUs) 108 to execute stored instructions. The CPUs 108 can be single core processors, multi-core processors, or any other suitable processors. In an example, the compute node 102 includes a single CPU. In another example, the compute node 102 includes multiple CPUs, such as two CPUs, three CPUs, or more. In another example, the compute node 102 includes at least one CPU 108. The CPU package can include additional system functions, such as memory controllers, memory, and I/O bridges. In an example, the CPUs 108 include local memory and local memory controllers.

The Compute node 102 can also include a master memory controller 110. In one embodiment, the master memory controller 110 is external to the CPUs 108, rather than being a built-in component of the CPUs 108. The master memory controller 110 attaches to a CPU 108, such as by attaching to the coherent transaction fabric of a commodity processor. A commodity processor is a processor available for purchase without special permission from the vendor. When the compute node 102 includes a CPU package, the master memory controller 108 is external to the CPU package and not included in the CPU package. In another example, the master memory controller 110 may be integrated onto the same device as the CPU 102. In further examples, compute node 102 may have multiple master memory controllers 110, each memory controller 110 interfacing with a portion of remote memory.

The computing device 100 also includes a remote memory node 104. In an example, the computing device 100 includes a single remote memory node 104. In another example, the computing device 100 includes multiple remote memory nodes 104. A remote memory node 104 is a collection of storage, such as a collection of memory devices, for storing a large amount of data. The remote memory node 104 may include a memory 112. In an example, the memory 112 comprises remote memory, or memory not included in the compute node 102. In another example, the remote memory node 104 is used as storage. In an example, a memory 112 includes volatile dynamic random access memory (DRAM), non-volatile phase change random access memory (PCRAM), spin transfer torque-magnetoresistive random access memory (STT-MRAM), resistive random access memory (reRAM), memristor, FLASH, or other types of memory devices. For example, the main memory 110 is solid state, persistent, dense, fast memory. Fast memory can be memory having an access time similar to DRAM memory.

Remote memory node 104 can be accessed by a single computing node 102 or multiple computing nodes 102. In an example, a single remote memory node 104 is associated with each computing node 102. In another example, a single remote memory node 104 is accessed by multiple computing nodes 102. In a further example, remote memory node 104 includes a pool of memory, such as non-volatile memory, divided into regions or ranges of memory address spaces. Each region of memory is assigned to a computing node 102 and, upon the failure of an assigned computing node 102, a region of memory can be assigned to a new computing node 102 or accessed by a different computing node 102.

A slave memory controller 114 can be coupled to each memory 112. The slave memory controller 114 controls access to the memory 112. A master memory controller 110 can route requests across the system fabric 106 to the slave memory controller 114, or to multiple slave controllers 114. In an example, the remote memory node 104 includes a buffer (not shown) to receive requests from the master memory controller 110 and transfer the requests to the slave memory controller 114. In a further example, the master memory controller 110 communicates directly with the memory 112.

The block diagram of FIG. 1 is not intended to indicate that the computing system 100 is to include all of the components shown in FIG. 1. Further, the computing system 100 may include any number of additional components not shown in FIG. 1, depending on the details of the specific implementation.

Figure 2:
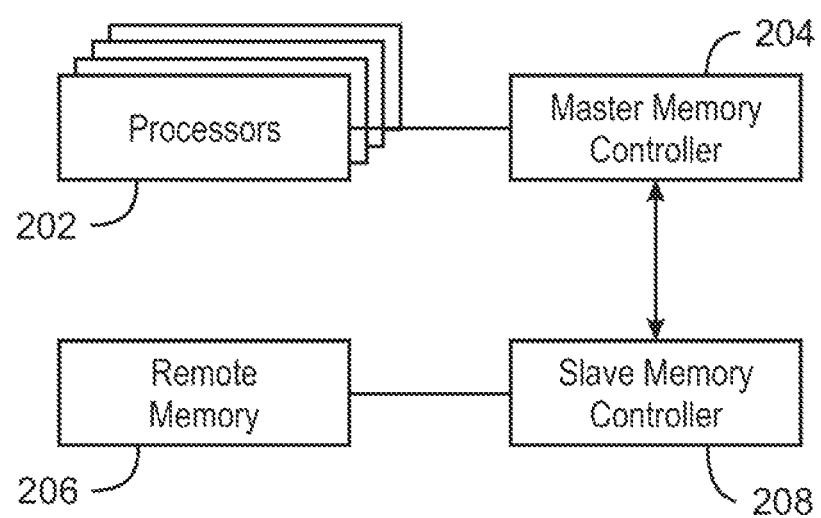
FIG. 2 is an illustration of an example of a communication pathway in a computing system.

FIG. 2 is an illustration of an example of a communication pathway in a computing system, such as the computing system 100, described with respect to FIG. 1. The processors 202 are coupled to the master memory controller 204. In an example, the processors 202 are included in a CPU package or a plurality of CPU packages, the CPU package(s) included in a computing node, such as computing node 102. Additional components, such as local memory and local memory controllers can be coupled to the processors 202 and included in the CPU package(s). The master memory controller 204 is external to the processors 202 and to the CPU package(s). In an example, the master memory controller 204 is coupled to the coherent transaction fabric(s) of the processors 202.

A processor 202 generates requests to access memory and sends the requests to the master memory controller 204. The requests can be read/write requests. In another example, the requests are generated by an IO interface of a computing node's CPU package(s). For example, the request can be a read request, a write request, a read/write request, or any other suitable type of request. In a further example, the request is a cache miss request that is generated and sent to the master memory controller 204 after the processor 202 verifies that requested data is not in the processor's cache.

The master memory controller 204 is external to, and coupled to, the processors 202. The master memory controller 204 receives requests to access memory from the processors 202. The master memory controller 204 communicates with the processors 202 as if the master memory controller is local to the processors 202. In an example, the processors 202 communicate with the master memory controller 204 with a communications protocol, such as an Intel QuickPath Interconnect (QPI) protocol. Intel QPI protocol is a point-to-point processor communication path. Upon receiving the request from the processors 202, the master memory controller 204 handles coherency exchanges between the processors 202. The coherency domain(s) including the processors 202 extend to the master memory controller 204. A coherency domain is an area of the computing system in which coherence, or synchronicity, of data is maintained. For example, each processor 202 can include a coherency domain including the processor and memory local to the processor. However, the coherency domain(s) do not extend beyond the master memory controller 204.

Upon receiving the request from a processor 202, the master memory controller 204 can convert the request, such as converting the request to reads and/or writes. For example, the master memory controller 204 can convert the request in the same manner a local memory controller converts requests. The master memory controller 204 determines the location of the memory address to which the request refers. The master memory controller 204 determines if the location of the memory address is local or remote.

In one example, if the master memory controller 204 determines that the memory address is local, the master memory controller 204 accesses the local memory (not shown). The master memory controller 204 then returns a response to the processor 202. The response can be any suitable response. For example, the response can be a notice of completion of the transaction. In another example, the response can be a notice that the transaction failed. The transaction can fail for a variety of reasons, such as inaccessible memory, memory failure, incorrect memory address, etc. In a further example, the response can be a return of requested data, such as data retrieved from memory. In an alternative example, the master memory controller may not interface with local memory.

If the master memory controller 204 determines the memory address is remote, the master memory controller 204 routes a corresponding, unique request to the remote memory 206. For example, the master memory controller 204 routes a request across a system fabric, for example, as described with respect to FIG. 1. In an example, the remote memory 206 may be a non-volatile memory. The remote memory 206 is physically separated from the processors 202 and the associated computing node.

The master memory controller 204 can route a new, custom request to a slave memory controller 208. In routing the request to the slave memory controller 208, the master memory controller 204 sends a non-coherent request transaction to the slave memory controller 208. As such, communication between a computing node including a master memory controller 204 and a node, such as a remote memory node, including a slave memory controller 208 occurs via proprietary protocols which support hardware and software tactics and a complete set of error protocols. Proprietary protocol can be routed either across a proprietary fabric, or tunneled through industry standard fabrics, such as a PCIe fabric or an Infiniband fabric.

Coherency transactions within the local computing node are not extended outside of the local node. Rather, the master memory controller 204 acts as a coherency proxy for the remote memory 206. As such, the coherency domains of nodes are not bound and the system fabric does not need to support cache coherency across multiple nodes. Additionally, coherency of requests, both to local memory and remote memory, within a local node is maintained without modification of standard processor components.

The master memory controller 204 is communicably coupled to the slave memory controller 208, such as with a communication fabric. The slave memory controller 208 is coupled to the remote memory 206 and controls access to the remote memory 206. In response to the request from the master memory controller 204, the slave memory controller 208 attempts to access the remote memory 206. The slave memory controller 208 returns a response to the master memory controller 204. The response can be any suitable response to a request. For example, the response can be a notice of completion of the transaction. In a further example, the response can be a return of requested data, such as data retrieved from memory.

In another example, the response can be a notice that the transaction failed. The transaction can fail for a variety of reasons, such as inaccessible memory, memory failure, incorrect memory address, etc. By isolating coherency transactions within the local computing nodes, error domains of remote nodes, such as a node including remote memory 206, are isolated from the computing node.

The master memory controller 204 receives the response from the slave memory controller 208 and generates a response to the processor 202. The response can be any suitable response. For example, the response can be a notice of completion of the transaction. In another example, the response can be a notice that the transaction failed. In a further example, the response can be a return of requested data, such as data retrieved from memory. In an example, the response is not identical to the response returned to the master memory controller 204 by the slave memory controller 208. For example, the master memory controller 204 can filter error messages from the slave memory controller 208 in order to isolate errors in the remote memory from the processor 202.

A memory error on the remote node is not directly transferred to the processor 202. Upon receiving a "response with error" message from the slave memory controller 208, the master memory controller 204 creates an appropriate response to the local node so that the remote memory error is not misinterpreted as a memory fault in the local coherency domain. Rather, the master memory controller 204 can signal an error to the local computing node in such a way that makes it clear that the error is in the remote memory and the local node can handle the error as appropriate. The failure of a portion of remote memory does not impact the system fabric or other nodes that are attached to the system fabric, but is handled as a problem local to the node that includes the remote memory. The master memory controller 204 includes one or more logging registers to enable the operating system OS to recover from remote errors. Errors in remote memory can be handled traditionally, with the operating system potentially stopping applications using the failing memory, or with the operating system stopping if the operating system is using the failing memory. Accesses to remote nodes can also be the result of software algorithms that are aware of the system topology of remote memory and the software can be written with possible remote errors in mind, enabling the software to recover from such errors. In another embodiment, some errors may be recoverable in the memory master by, for instance, accessing a mirrored copy of data on another connected memory slave, or by retrying the transaction through an alternate fabric path for fabric induced errors.

The communication pathway 200 enables accesses to remote memory, I/O, and storage via load/store semantics on a local node, and also allows such requests to be turned into 'remote messages' in the hardware of the computing system. As such, the communication pathway 200 breaks an application's dependency on a CPU vendor's choice of memory-to-core and I/O-to-core ratios by enabling the external master memory controller 204 to be attached directly to the processors or CPU packages of a local node. As such, local memory, memory included in the local node, e.g., memory included in a CPU package or directly connected to a processor, and local I/O can be augmented with access to additional data center resources, such as remote memory and I/O storage, easing resource limitations of CPU packages. Access to the remote memory and I/O storage can be mapped into the address space of the local node. Shared storage, such as remote storage and I/O storage, can be used to pass messages or data between multiple nodes, such as compute nodes and remote memory nodes.

Figure 3:
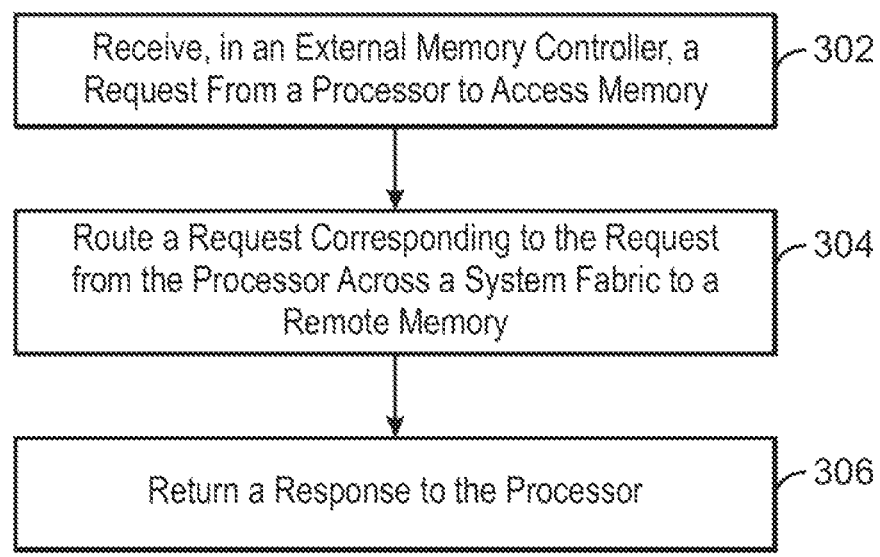
FIG. 3 is a process flow diagram illustrating an example of a method of accessing memory.

FIG. 3 is a process flow diagram illustrating an example of a method 300 of accessing memory. At block 302, a request from a processor to access memory is received in an external memory controller. The request can be a read request, a write request, a read/write request, or any other type of request. In an example, the processor is a single processor. In another example, the processor is one of a plurality of processors. The memory controller is external to the processor. In an example, the processor is included in a CPU package and the master memory controller is external to, and not included in, the CPU package.

At block 304, the external memory controller routes a unique request corresponding to the request from the processor across a system fabric to a remote memory. In an example, the remote memory comprises non-volatile memory. In a further example, the remote memory is included in a remote memory node. In a further example, a remote memory node comprises a plurality of remote memory devices, each remote storage device coupled to a slave memory controller. The system fabric can be any type of communication fabric. The system fabric can be a low latency, high bandwidth, highly reliable fabric. In an example, the system fabric can be a communication fabric, such as an industry standard fabric or a propriety fabric as discussed with respect to FIG. 1.

At block 306, the external memory controller returns a response to the processor. The response can be any suitable response to the request. For example, the response can be a notice of completion, an error notice, requested data, a combination or responses, or any other suitable response.

It is to be understood that the process flow diagram of FIG. 3 is not intended to indicate that the steps of the method 300 are to be executed in any particular order, or that all of the steps of the method 300 are to be included in every case. Further, any number of additional steps not shown in FIG. 3 may be included within the method 300, depending on the details of the specific implementation.

Figure 4:
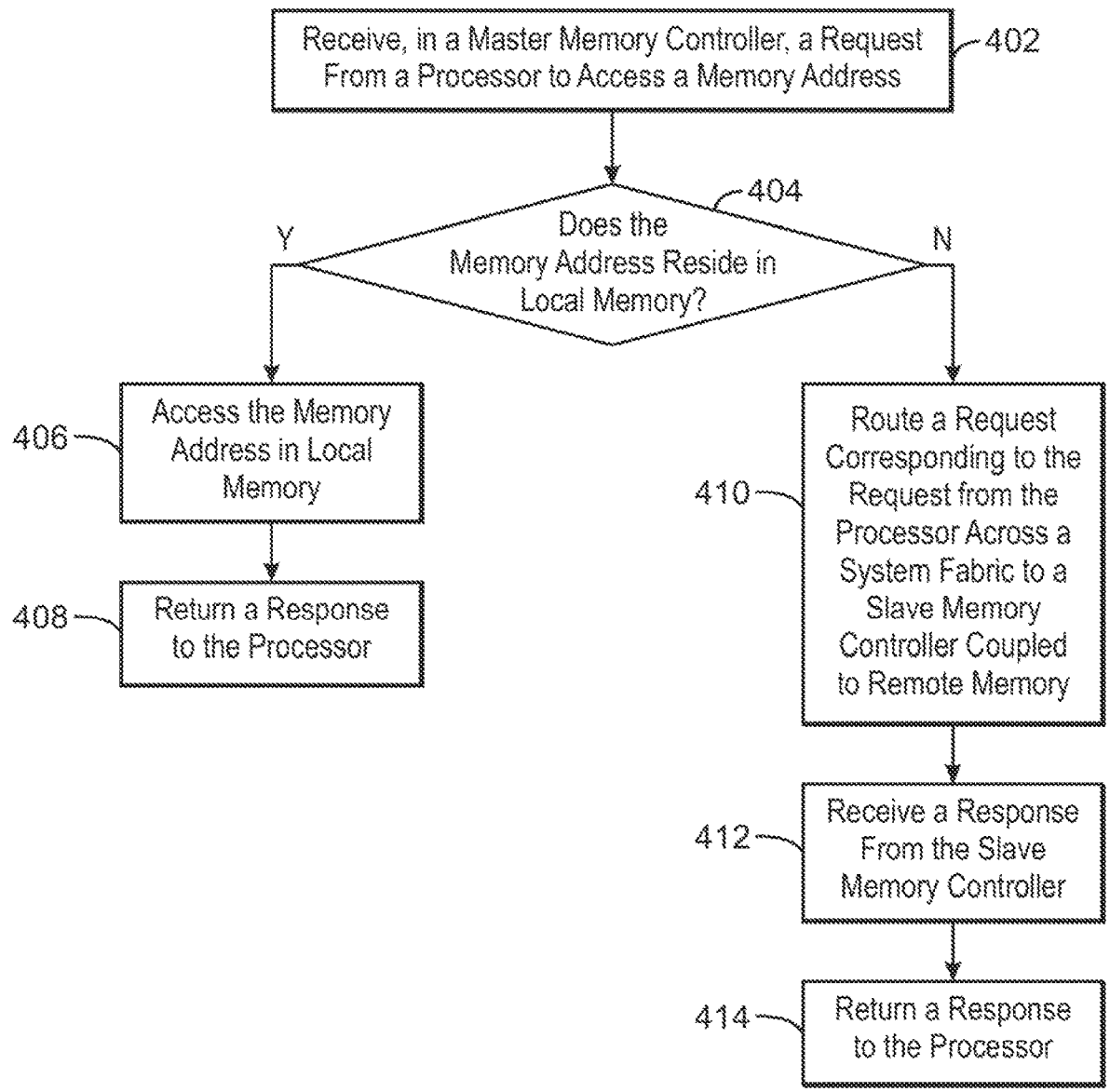
FIG. 4 is a process flow diagram illustrating an example of a method of accessing memory.

FIG. 4 is a process flow diagram illustrating an example of a method 400 of accessing memory. At block 402, a request from a processor to access a memory address is received in a master memory controller. The request can be a read request, a write request, a read/write request, or any other type of request. In an example, the processor is a single processor. In another example, the processor is one of a plurality of processors. The master memory controller is external to the processor. In an example, the processor is included in a CPU package and the master memory controller is external to, and not included in, the CPU package.

At block 404, the master memory controller determines if the memory address resides in local memory. Local memory is memory coupled to the processor. If the processor is included in a CPU package, the local memory can also be included in the CPU package. If the memory address does reside in local memory, the master memory controller accesses the memory address in local memory at block 406. At block 408, the master memory controller returns a response to the processor. The response may be any suitable response to the request. For example, the response may be a notice of completion, an error notice, requested data, a combination or responses, or any other suitable response.

If the memory address does not reside in local memory, at block 410 the master memory controller routes a unique request corresponding to the request from the processor across a system fabric to a slave memory controller coupled to remote memory. In an example, the remote memory comprises non-volatile memory. In a further example, the remote memory and slave memory controller are included in a remote memory node. In a further example, a remote memory node comprises a plurality of remote memory devices, each remote memory device coupled to a slave memory controller. The system fabric can be any type of communication fabric. The system fabric can be a low latency, high bandwidth, highly reliable fabric. In an example, the system fabric can be a communication fabric, such as an industry standard fabric or a propriety fabric as discussed with respect to FIG. 1.

At block 412, the master memory controller receives a response from the slave memory controller. The response can be any suitable response to the request. For example, the response can be a notice of completion, an error notice, requested data, a combination or responses, or any other suitable response.

At block 414, the master memory controller returns a response to the processor. The response can be any suitable response to the request. For example, the response can be a notice of completion, an error notice, requested data, a combination or responses, or any other suitable response.

The master memory controller is included in the coherency domain including the processor. The coherency domain does not extend to the slave controller or the remote memory. The request is a coherent request and is resolved by the coherency domain which includes the master memory controller. The master memory controller communicates with local memory and remote memory using non-coherent transactions. By confining the coherency domain to the master memory controller, the processors are isolated from the remote memory and any failures associated therewith. The master memory controller thus acts as a coherency proxy for the remote memory assigned to the processor, maintaining coherency of memory references to local and remote memory units without modification of standard processor components. For example, the remote memory contents may be stored using mirroring or RAID protocols that employ additional reads and/or writes between master and slave controllers before the master sends the completion response to the processor.

It is to be understood that the process flow diagram of FIG. 4 is not intended to indicate that the steps of the method 400 are to be executed in any particular order, or that all of the steps of the method 400 are to be included in every case. Further, any number of additional steps not shown in FIG. 4 may be included within the method 400, depending on the details of the specific implementation.

Example 1

A computing system is disclosed herein. The computing device includes a computing node. The computing node includes a plurality of processors and a master memory controller, the master memory controller external to the plurality of processors. The computing device also includes a remote memory node coupled to the computing node via a system fabric. The master memory controller routes a request corresponding to a request from the plurality of processors across the system fabric to the remote memory node and returns a response.

The response can include one of a notice of completion, an error notice, requested data, or a combination thereof. The plurality of processors can interact with the remote memory node as local memory via the master memory controller. When the master memory controller receives a request from a processor to access memory local to the processor, the master memory controller fulfills the request within the computing node. A coherency domain of the computing node extends only the master memory controller. The master memory controller can isolate remote memory node errors from the plurality of processors by filtering error messages received from the remote memory node. The remote memory node can include memory coupled to a slave memory controller and the master memory controller can route requests to the slave memory controller.

Example 2

A method is disclosed herein. The method includes receiving, in an external memory controller, a request from a processor to access memory. The method also includes routing a request corresponding to the request from the processor across a system fabric to a remote memory. The method further includes returning a response to the processor.

Returning the response can include returning one of a notice of completion, an error notice, data accessed from the remote memory, or a combination thereof. The processor can reside in a CPU package and the external memory controller can reside externally to the CPU package. The processor can perceive the remote memory as local memory by communicating through the external memory controller. The method can further include accessing locally stored data prior to routing the request across the system fabric. The method can further include filtering error messages to isolate remote memory errors from the processors. Routing the request can include routing the request across the system fabric to a memory controller coupled to the remote memory. The method can include extending a coherency domain of the processor only to the external memory controller.

Example 3

A system for accessing memory is disclosed herein. The system includes a master memory controller to receive requests from a plurality of processors, the master memory controller external to the processors. The system also includes a slave memory controller communicably coupled to the master memory controller via a system fabric. The system further includes a memory, remote from the processors, coupled to the slave memory controller. The master memory controller routes requests corresponding to the requests from the plurality of processors to the slave memory controller to access the remote memory.

The plurality of processors can include a CPU package, wherein the master memory controller is external to the CPU package. The plurality of processors can perceive the memory remote from the processors as local memory by communicating via the master memory controller. The master memory controller can filter error messages to isolate the processors from remote memory errors. The requests from the processors can include coherent transactions, and the master memory controller communicates with the slave memory controller via non-coherent transactions, such that a coherency domain of the processors extends only to the master memory controller.

The presently described technical examples may be susceptible to various modifications and alternative forms and have been shown only for illustrative purposes. For example, the present techniques support both reading and writing operations to a data structure cache. Furthermore, it is to be understood that the present techniques are not intended to be limited to the particular technical examples disclosed herein. Indeed, the scope of the appended claims is deemed to include all alternatives, modifications, and equivalents that are apparent to persons skilled in the art to which the disclosed subject matter pertains.

What is claimed is:

1. A computing system, comprising:
   a computing node comprising:
     a plurality of processors; and
     a master memory controller, the master memory controller external to the plurality of processors; and
   a remote memory node coupled to the computing node via a system fabric,
     wherein the remote memory node comprises memory coupled to a slave memory controller;
   wherein the master memory controller:
     receives, from a first processor of the plurality of processors, a first request to access the memory in the remote memory node;
     routes the first request as a second request across the system fabric to the slave memory controller of the remote memory node,
     which causes the slave memory controller to send a third request to the memory of the remote memory node, receive a first response from the memory of the remote node, and send to the master memory controller a second response which indicates an error message;
     receives the second response from the slave memory controller; and
     returns, to the first processor, a third response which filters the error message indicated in the second response received by the master memory controller from the slave memory controller.

2. The computing system of claim 1, wherein the plurality of processors interacts with the remote memory node as local memory via the master memory controller.

3. The computing system of claim 1, wherein when the master memory controller receives a request from a processor to access memory local to the processor, the master memory controller fulfills the request within the computing node.

4. The computing system of claim 1, wherein the master memory controller isolates remote memory node errors from the plurality of processors by filtering error messages received from the remote memory node.

5. The computing system of claim 1, wherein responsive to receiving the second response from the slave memory controller, the master memory controller:
   signals, to the computing node, that an error indicated in the second response is in the remote memory and is handled as a problem local to the remote memory node.

6. A method, comprising:
   receiving, by a master memory controller external to a plurality of processors, a first request from a first processor to access memory in a remote memory node, wherein the remote memory node comprises the memory coupled to a slave memory controller;
   routing, by the master memory controller, the first request as a second request across a system fabric to the slave memory controller of the remote memory node, which causes the slave memory controller to send a third request to the memory of the remote memory node, receive a first response from the memory of the remote node, and send to the master memory controller a second response which indicates an error message;
   receiving, by the master memory controller, the second response from the slave memory controller; and
   returning, by the master memory controller to the first processor, a third response which filters the error message indicated in the second response received by the master memory controller from the slave memory controller.

7. The method of claim 6, wherein the third response comprises one of a notice of completion, an error notice, data accessed from the remote memory, or a combination thereof.

8. The method of claim 6, wherein the processor resides in a CPU package and the master memory controller resides externally to the CPU package.

9. The method of claim 6, comprising accessing locally stored data prior to routing the first request across the system fabric.

10. The method of claim 6, further comprising filtering error messages to isolate remote memory errors from the processors.

11. The method of claim 6, wherein responsive to receiving the second response from the slave memory controller, the method further comprises:
   signaling, by the master memory controller to the computing node, that an error indicated in the second response is in the remote memory and is handled as a problem local to the remote memory node.

12. A system for accessing memory, comprising:
   a master memory controller to receive requests from a plurality of processors, the master memory controller external to the processors;
   a slave memory controller communicably coupled to the master memory controller via a system fabric; and
   a memory, remote from the processors, coupled to the slave memory controller,
   wherein the master memory controller:
      routes a first request as a second request to the slave memory controller to access the remote memory, which causes the slave memory controller to send a third request to the memory of the remote memory node, receive a first response from the memory of the remote node, and send to the master memory controller a second response which indicates an error message;
      receives the second response from the slave memory controller; and
      returns, to the processors, a third response which filters the error message indicated in the second response received by the master memory controller from the slave memory controller.

13. The system of claim 12, wherein the plurality of processors comprises a CPU package, and wherein the master memory controller is external to the CPU package.

14. The system of claim 12, wherein the plurality of processors perceives the memory remote from the processors as local memory by communicating via the master memory controller.

15. The system of claim 12, wherein the requests from the processors comprise coherent transactions, and wherein the master memory controller communicates with the slave memory controller via non-coherent transactions, such that a coherency domain of the processors extends only to the master memory controller.

\* \* \* \* \*